United States Patent [19]

Nowack

[11] Patent Number: 4,565,553
[45] Date of Patent: Jan. 21, 1986

[54] METHOD FOR THE REMOVAL AND DISPOSAL OF PAINT SOLVENT

[76] Inventor: William C. Nowack, 340 Kriwel, Twin Lakes, Wis. 53181

[21] Appl. No.: 614,101

[22] Filed: May 24, 1984

[51] Int. Cl.$^4$ .............................................. B01D 53/04
[52] U.S. Cl. ................................... 55/59; 34/DIG. 1; 55/74
[58] Field of Search ................... 34/32, 40, 43, 80, 82, 34/DIG. 1; 55/18, 20, 59, 62, 74, 88, 89, 161, 179, 180, 208, 387, DIG. 46; 118/61, 75

[56] References Cited

U.S. PATENT DOCUMENTS

| | | | |
|---|---|---|---|
| 3,455,089 | 7/1969 | Mattia | 55/179 X |
| 3,472,498 | 10/1969 | Price et al. | 263/40 |
| 3,780,674 | 12/1973 | Liu | 110/8 R |
| 3,875,678 | 4/1975 | Vits | 34/32 |
| 3,902,874 | 9/1975 | McAndrew | 55/180 X |
| 3,909,953 | 10/1975 | Hemsath et al. | 34/26 |
| 3,918,932 | 11/1975 | Lee et al. | 55/88 X |
| 3,979,175 | 9/1976 | Kattan et al. | 55/88 X |
| 4,025,324 | 5/1977 | Stackhouse, Jr. et al. | 55/179 |
| 4,058,147 | 11/1977 | Stary et al. | 55/88 X |
| 4,088,465 | 5/1978 | Uda et al. | 55/18 X |
| 4,257,783 | 3/1981 | Gutjahr et al. | 118/61 X |
| 4,289,505 | 9/1981 | Hardison et al. | 55/180 X |
| 4,331,630 | 5/1982 | Van Pool | 422/160 |
| 4,343,629 | 8/1982 | Dinsmore et al. | 55/208 X |
| 4,354,440 | 10/1982 | McRee, Jr. | 110/346 |
| 4,414,003 | 11/1983 | Blaudszun | 55/208 X |

OTHER PUBLICATIONS

Barnebey–Cheney, Columbus, OH, *Activated Carbon Purification & Recovery Equipment*, "Adsorption Equipment for Air Pollution Control," pp. 1–4.
Barnebey–Cheney, Columbus, OH, "Series F Filter-Fold Adsorber," pp. 1–4.
Max K. Carthew, "Special Report Pollution Control: Controlling Paint Fume Emissions," *Industrial Finishing*, Apr. 1983, pp. 28–29.
"Carbon Adsorption," pp. 30–31.
Baron-Blakeslee, Inc., Melrose Park, IL, 4 pp.
Bildon Industries, Inc., Lake Geneva, WI, advertisement, *Industrial Finishing*, Jun. 1983, p. 52.

*Primary Examiner*—Robert Spitzer
*Attorney, Agent, or Firm*—Leydig, Voit & Mayer, Ltd.

[57] ABSTRACT

An industrial painting method and system utilizing a washer, dry-off oven, spray booth, and bake oven, in which solvent paint vapors from the spray booth are concentrated in a filter which is subsequently degassed by a flow of hot air from the dry-off oven, and the degassed vapors admixed with the atmosphere of the bake oven. The bake oven atmosphere is continuously circulated to the washer and burned in the burner of the washer to incinerate solvent vapors, and the gasses produced by incineration are transported to the dry-off oven to form the atmosphere thereof. The principal exhaust from the system occurs from the dry-off oven and is substantially free of solvent vapors and of low temperature.

13 Claims, 5 Drawing Figures

METHOD FOR THE REMOVAL AND DISPOSAL OF PAINT SOLVENT

The present invention relates to systems and method for the incineration of combustible waste products contained in exhaust gases discharged into the atmosphere. The system and method of the present invention are particularly suited to industrial painting systems.

It is conventional practice in industry today to paint parts to be used in the assembly of consumer products and industrial machines in a continuous and automated system. The parts are generally of metal, although they may be of other materials such as plastic, and the parts are mounted on an overhead conveyor on hangers and transported through the system. Such parts may first be cleansed in a washer, and thereafter transported through a dry-off oven to remove moisture from the parts. After the parts have been dried, they are transported to a spray booth, where paint is applied to the parts. Finally, the parts may be transported to a bake oven where the parts are heated to volatilize the solvent of the paint and to cure the paint to a thin dry film of pigment on the article or part being processed. The washer, dry-off oven, spray booth, and bake oven can be operated as a batch system in which the parts remain at rest during processing, or they may be utilized with a continuously moving conveyor in a continuous process. High volume production and low cost production generally dictate the use of a continuous process.

In the continuous painting processes presently used, the solvent from the paint is discharged into the atmosphere and thus is an air pollutant. Approximately 20% of the solvent from the paint is removed in the bake oven, and industry has frequently discharged such solvents to the atmosphere, causing a pollution problem and a loss of thermal energy. About 70% of the solvent lost in an industrial painting system occurs in the spray booth. The solvent in the atmosphere of the spray booth becomes contaminated and large quantities of air are caused to flow through the spray booth to remove the solvent from the spray booth for purposes of human safety and to prevent explosion. In the past, the quantities of air used to cleanse the spray booth were also exhausted to the ambient atmosphere. The remaining approximately 10% of the solvent lost in the industrial painting process is lost to the rooms in which the painting occurs, and this atmosphere also is exhausted to the ambient surroundings by ventilation systems.

It has long been recognized that the solvents which evaporate from paint in an industrial painting process can be burned in a flame incinerator, and since the solvents are hydrocarbons, the oxidation of these hydrocarbons will reduce the solvents to water ($H_2O$) and carbon dioxide ($CO_2$). U.S. Pat. No. 3,472,498 of Price et al. entitled AIR POLLUTANT INCINERATOR, Oct. 14, 1969, describes the prior art at that time and seeks to provide an improved apparatus for incinerating paint solvents from the bake oven in an industrial painting system. Specifically, Price utilizes a particular incinerator and blower construction coupled to the atmosphere of the bake oven, in order to incinerate fumes in the bake oven, and Price introduces cooling air between the incinerator and a blower for the purpose of reducing the temperature to permit the incinerated air to be transmitted to the dry-off oven and returned to the bake oven in specific portions.

Incinerators themselves for disposing of the fumes of paint are also disclosed in U.S. Pat. No. 3,875,678 to Vits entitled METHOD AND APPARATUS FOR PURIFYING EXHAUST AIR OF A DRYER APPARATUS. The large quantities of flue gases which must be subjected to an afterburner and the high temperature of the gases from the afterburner are described in the Vits patent as deleterious, and Vits utilizes the exhaust heat from the afterburner or incinerator to heat a heat carrier (thermo-oil) which is supplied to the dryer for heating its atmosphere.

The art also contains a number of specific incinerator constructions, such as U.S. Pat. No. 4,354,440 of McRee, Jr. entitled UNDER FIRE AIR AND STEAM SYSTEM AND INCINERATING PROCESS FOR A CONTROLLED STARVED-AIR INCINERATOR which produces steam from waste materials, U.S. Pat. No. 4,331,630 of Van Pool entitled APPARATUS FOR INCINERATION OF SULFUR PLANT TAIL GAS, and U.S. Pat. No. 3,780,674 to Liu entitled LIQUID INCINERATOR. These patents do not disclose any particular utility for the incinerators thereof with respect to an industrial painting system.

The industrial painting systems of the prior art which utilized an incinerator have limited the use of the incinerator to the bake oven or curing oven. Only 20% of the solvent is actually removed in the curing oven, while about 70% of the solvent evaporates in the spray booth and is typically exhausted into the atmosphere. It is thus a primary object of the present invention to reduce pollution of the atmosphere caused by the high solvent containing exhaust of from the spray booth by first concentrating the solvent from the spray booth atmosphere in a solvent concentrating means, controlling the release of the solvent from the solvent retaining means to desired concentrations, and subsequently burning the released solvent.

Insurance requirements dictate that large quantities of air flow through the bake oven of an industrial painting system in order to limit the level of solvent to air to safe levels. Approximately 10,000 standard cubic feet of air must flow through the bake oven for each gallon of common paint solvent that is evaporated. In the prior art industrial painting systems, large quantities of heated air are exhausted to the atmosphere with a loss of thermal efficiency to the system. It is, accordingly, an object of the present invention to provide an industrial painting system that significantly reduces the amount of air and heat which must be exhausted to the atmosphere from the bake oven, and it is a further object of the present invention to provide a complete system of washer, dry-off oven, spray booth and bake oven which will exhaust relatively little air to the atmosphere and will exhaust to the atmosphere relatively little heat from the process. It is accordingly an object of the present invention to provide an integrated system of washer, dry-off oven, spray booth, and bake oven which utilizes significantly less heat than such a system of the prior art.

In order to reduce solvent contamination of the spray booth surroundings and to maintain the atmosphere within the spray booth with a sufficiently low solvent content, it is necessary to circulate large quantities of air through the spray booth. Typically, 70% of the solvent vapors which are generated by the industrial spraying system will occur in the spray booth and these solvent vapors are exhausted to the atmosphere by the air circulating through the spray booth.

In accordance with one aspect of the present invention, a separate circulation of air is maintained from the atmosphere, through the spray booth and as the air is exhausted from the spray booth, through a solvent concentrating means or filter. The filter is effective to remove solvent from the air circulated through the spray booth, and the filtered air is exhausted from the filter to the atmosphere essentially free of solvent vapors.

Air filters are well known, and a number of commercially available materials are used to adsorb solvent contaminents from air. Among these materials are carbon, silica gel, activated alumina, molecular sieves and certain clays. Most effective of these materials is generally considered to be activated carbon, that is, carbon which has been subjected to steam in order to provide voids within the carbon. Such products are commercially available, and it is known that activated carbon will adsorb hydrocarbons efficiently, and can be degassed by a flow of hot air.

It is also known that hydrocarbons are released from an activated carbon filter roughly in the order of their molecular weight if the filter is subjected to a flow of heated air at a temperature between 100° F. and 160° F. If air at a temperature about 160° F. is utilized to degas a hydrocarbon loaded activated carbon filter, the hydrocarbons tend to be released simultaneously regardless of molecular weight.

Prior to the present invention, degassing of an activated carbon filter loaded with hydrocarbons resulted in an initial release of large quantities of hydrocarbons followed by a declining release until the filter became degassed. The initial release of large quantities of hydrocarbons is unsatisfactory for the method and system of the present invention because the presence of high levels of vapor hydrocarbons possess the danger of explosion, and further because large concentrations of hydrocarbon vapors in the incinerator modify the operating conditions of the incinerator and the release of heat with time for the incinerator. Accordingly, another aspect of the present invention provides a method for degassing a filter loaded with hydrocarbons under which the rate of release of the hydrocarbons is controlled over a prolonged period of time.

Thus, in accordance with the present invention, the solvent vapors trapped by the filter are concentrated by the controlled release of the solvent from the filter by adjusting the rate of gas flow through the filter and the temperature of the gas used for degassing. While a variety of gases may be suitably employed, such, for example as nitrogen, argon or the like, air is preferably employed for its economy and availability. Hereinafter the method of the present invention will be described using air but it should be understood that other gases may likewise be used.

The desired air velocity and temperature of the air passed through the filter for degassing are so selected that the solvent concentration in the air exhausted from the filter does not exceed the lower explosive limit for the solvent. The solvent may then be disposed of by incineration or the like.

In the preferred embodiment, when a bake oven for curing the painted part is employed, the solvent laden filter exhaust air is circulated to the bake oven and the bake oven exhaust is then burned in an incinerator, such as a washer or the like. When the solvent laden filter exhaust air is fed to the bake oven, the air velocity and air temperature of the air used for filter degassing are so selected that the concentration of solvent in the exhaust from the filter, when combined with the atmosphere of the bake oven, is such that the total solvent concentration in the bake oven does not exceed the lower explosive limit of the designed theoretical level of operation. Typically, the total solvent concentration in the bake oven is designed to be about 20% of the lower explosive limit.

Suitable air degassing velocities may vary over a wide range and should be selected such that the pressure drop across the filter is less than about six inches of water.

Suitable air degassing temperatures are in the range of from about 100° F. to about 280° F. It is contemplated that air from the dry-off oven will be used to degass the filter without any additional energy requirements since the exhaust air from the dry-off oven is often in the range of about 200° F. to 400° F. If the dry-off oven exhaust air is too high, for example greater than about 270° F. or so, it may be necessary to dilute it with ambient air to cool the dry-off oven exhaust air to the temperature desired for degassing.

In many applications it may be desirable to utilize a second filter identical to the first to remove the solvent from the air in the spray booth during periods in which the first filter must be degassed. Thus, the first filter will be degassed within the time period required for loading the second filter with solvent. Hence, the alternate use of two identical filters of adequate capacity will result in a continuous operation, and there will be no burst of solvent vapors from the degassing process that will require special precaution to prevent explosion or impose load requirements on the incinerator.

In accordance with a further aspect of the present invention, the burner of the washer is utilized as the incinerator for fumes from the bake oven. In one form of conventional washer, a large tank of water is provided with a tube submerged therein, and the tube is heated by a flame from a burner fed with natural gas. Water from the tank is then circulated through sprayers to impinge upon the items being processed and thereafter returned to the tank for further heating. By mixing the solvent laden air from the bake oven with the fuel feeding burner, the solvent is oxidized within the flame to $CO_2$ and water. It will be appreciated that the solvent forms a supplement to the fuel feeding the burner thereby reducing the fuel requirement for the system.

Further, the region of the tube between the flame and the exit end of the tube functions as a heat exchanger to transfer the heat from the flame to the water in the tank, and therefore the gases emerging from the exit end of the tube are at a reduced temperature of approximately 450° to 600° F., and are further substantially oxygen free. Hence, these gases may be used directly to provide heat for the dry-off oven or the bake oven without cooling.

The quantity of air which may be transferred from the bake oven to the burner of the washer is limited by the capacity of the burner, but in practice it is sufficiently large to provide 10,000 standard cubic feet of air per minute for each gallon of solvent that is evaporated. The atmosphere within the bake oven is confined by the walls of the oven and by air seals operating at the inlet opening and exit opening of the oven, these air seals being effective to prevent the introduction of the ambient atmosphere into the oven during operation, and to confine the atmosphere within the bake oven. Air seals of the type disclosed in the inventor's U.S. Pat. No. 4,298,341 entitled INDUSTRIAL OVEN HAVING AIR RECIRCULATING MEANS FOR MINIMIZING HEAT LOSS granted Nov. 3, 1981, are effective for this purpose. As noted above, solvent laden air from the solvent concentrating means is circulated through the bake oven such that the amount of solvent introduced into the bake oven increases the solvent concentration in the atmosphere of the bake oven to not greater than 20% of the lower explosive limit of the solvent in order to prevent explosion and to comply with operating government regulations. This is typically the designed solvent capacity of the bake oven. This solvent concentration is so maintained by providing an adequate flow of air through the bake oven, and if a washer is used, the burner of the washer is capable of accepting that entire flow.

Further, since the temperature of the exhaust gases from the tube of the washer/incinerator are at a relatively low temperature, such as 400° F., these exhaust gases are directly usable in the dry-off oven. The dry-off oven is also provided with air seals at the inlet opening and exit opening in order to confine the atmosphere within the dry-off oven. Since the washer burner requires additional combustion air to that from the bake oven and natural gases to burn, a portion of the gas flow from the dry-off oven may be transported directly to the bake oven to provide the make-up air required to balance the flow of solvent vapor containing air from the bake oven to the washer/burner. A portion of the gasses from the dry-off oven is also exhausted to the atmosphere, and since the atmosphere of the dry-off oven is of relatively low temperature and free of solvent contamination, the exhaust to the atmosphere is non-polluting and removes little heat from the system.

The present invention will be more fully and completely understood with reference to the following drawings, in which.

Figure 1:
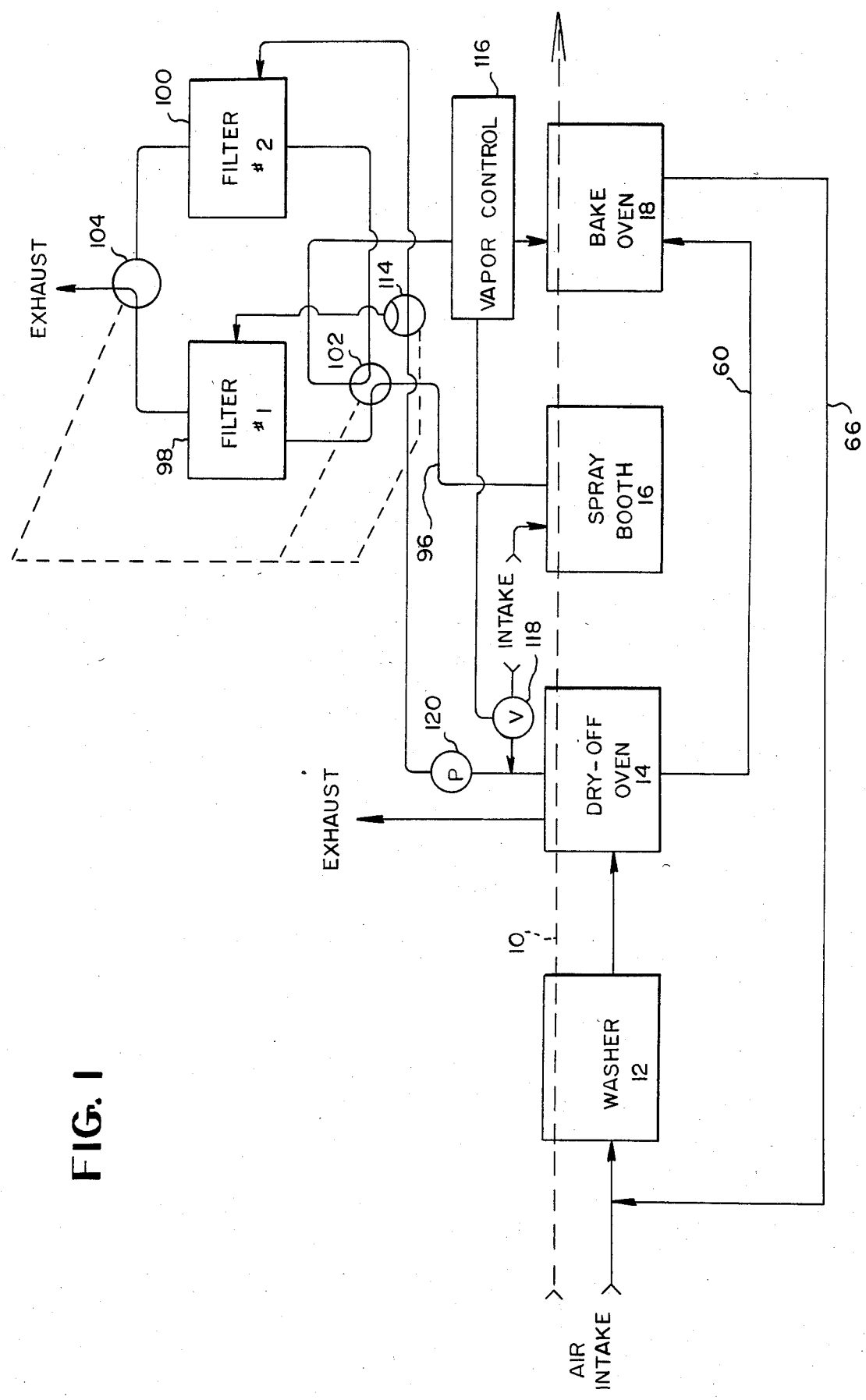
FIG. 1 is a diagrammatic view of an industrial painting system and apparatus according to the present invention.

FIG. 1 illustrates a commercial system in which parts to be painted are conveyed on a monorail illustrated by the dashed line 10 through a washer 12, dry-off oven 14, spray booth 16, and a bake oven 18. The completed painted product emerges on the monorail 10 from the bake oven 18.

Figure 3:
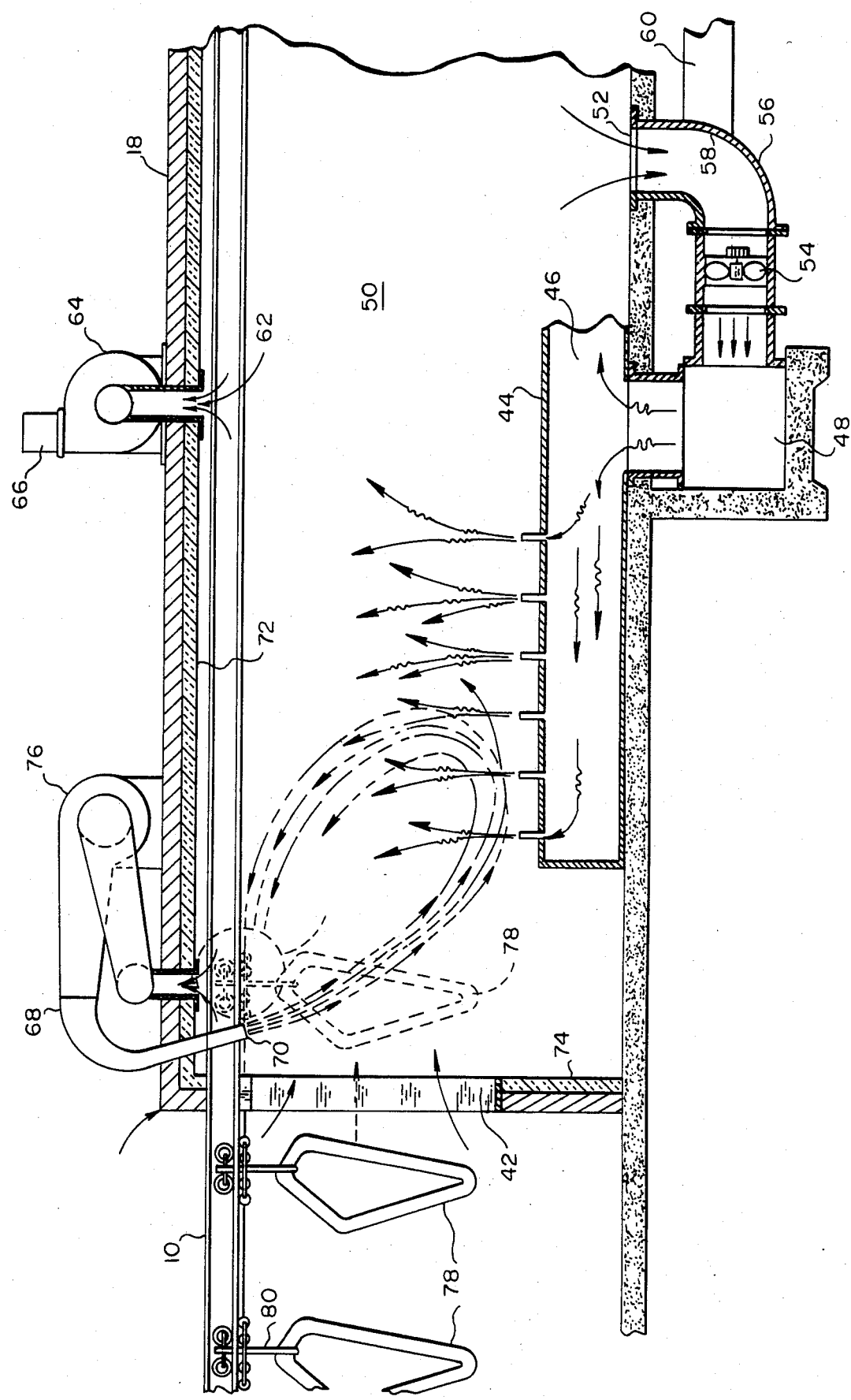
FIG. 3 is a longitudinal sectional view of a bake oven.
Figure 4:
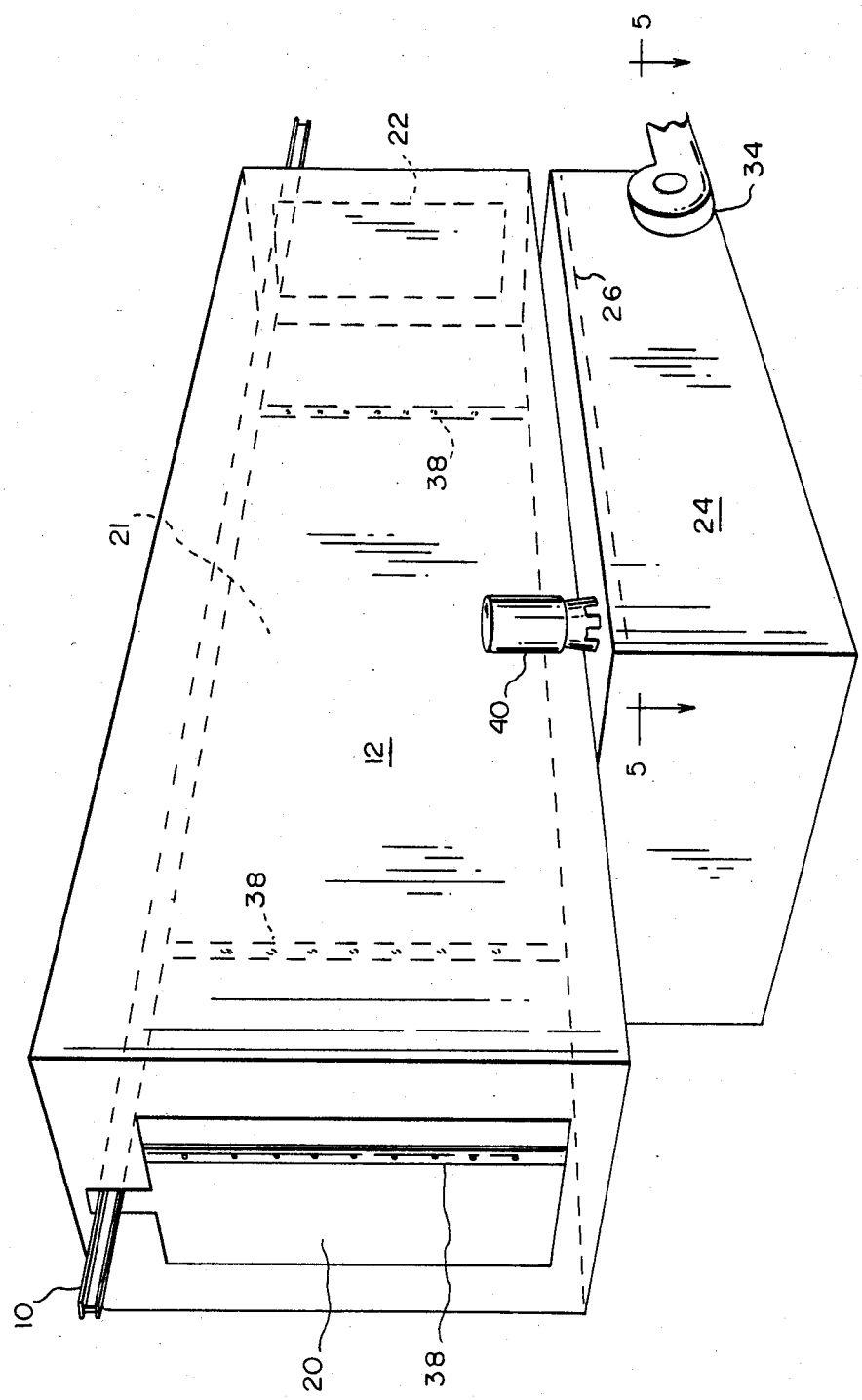
FIG. 4 is an isometric view of a parts washer for use in the present invention.

The washer 12 is generally illustrated in FIG. 4, and it will be noted that the monorail 10 enters the washer 12 at the upper side of an opening 20, extends through a passage 21 and exits from the opposite side of the washer 12 at the upper side of a second opening 22. Products to be painted are carried on and depend from the monorail 10 in the manner illustrated in FIG. 3.

The washer 10 is provided with a tank 24 disposed in the lower portion thereof, below the passage 21. The tank 24 is substantially filled with water, the water level being indicated by the dashed line 26. Beneath the surface of the water in the tank 24 is a serpentine tube 28 which enters through a first port 30 and exits through a second port 32. (FIG. 5) A burner 34, preferably fueled by natural gas, is disposed exterior of the tank 24 and communicates with the port 30 to produce a flame 36 which extends a substantial distance down the tube 28. In this manner, the water 25 surrounding the tube 28 is heated, and the water in the tank 24 is transported to apertured tubes 38 which line the passage 21 through tubing and a pump 40. The apertured tubes 38 line both sides of the passage 21, although FIG. 4 illustrates only a few such tubes 38 for clarity. As a result, water is pumped into the passage 21 to spray against the parts of the work load as they travel down the monorail 10 to cleanse the parts.

After the parts are cleaned, they enter the dry-off oven 14 where the parts are dried. The parts continue to be carried on the monorail out of the dry-off oven 14 and into the spray booth 16. In the spray booth, a layer of paint is applied to the parts. The parts then leave the spray booth 16, the paint remaining wet, and enter the bake oven 18. In the bake oven 18, the paint is cured or dried, to produce a baked paint finish on the parts. The parts leave the bake oven 18 with a hard paint finish.

Since the dry-off oven 14, and bake oven 18 are provided with inlet openings and exit openings for the monorail 10 and parts carried by the monorail, it is necessary to provide seals for these openings in order to control the atmosphere within the dry-off oven and bake oven. It may be desirable to control the atmosphere of the washer 12 for the purposes of economizing on heat and to prevent moisture from entering the surroundings. The warm water vapor used in the washer 12 does not represent an environmental hazard.

The bake oven 18 operates at a relatively high temperature, i.e., about 350° F. in the preferred construction of the present invention, and it is known that significant heat may be saved by the use of air seals on the bake oven. To a lesser extent, heat may also be saved in the dry-off oven by the use of air seals. It is in any event necessary to control the atmosphere from the bake oven in accordance with the teachings of this invention in order to reduce the escape of vapors from the painting process and reduce the environmental contamination.

The air seal illustrated in FIG. 3 is suitable for use in the washer 12, dry-off oven 14, and bake oven 18 for both the inlet and exit openings. The air seal is more fully described in the present inventor's U.S. Pat. No. 4,298,341.

The construction of the oven 18 is illustrated in some detail in FIG. 3. The oven has an inlet opening and an outlet opening, FIG. 3 illustrating only the inlet opening 42, the outlet opening being identical. The oven 18 is heated by a heating system 44 with a manifold 46 for circulating the heated air. The heating system 44 also has a heat exchanger 48 which is coupled to the interior chamber 50 of the bake oven 18 through a port 52, and a fan 54 recirculates air from the chamber 50 through the heat exchanger 48 and manifold 44 to distribute the heat within the bake oven 18. The port 52 is coupled to the fan 54 by a conduit 56, and the conduit 56 has a port 58 which is connected to the dry-off oven 14 by a tube 60 in order to introduce air and gasses from the dry-off oven 14, as previously described. In addition, the bake oven 18 has a second port 62 which is connected to the air intake of the burner 34 of the washer 12 through an impeller 64 and a conduit 66.

The air seal, or heat retention means, is illustrated associated with the inlet opening 42 and designated 68. A nozzle 70 mounted adjacent to the upper wall 72 of the bake oven 18 adjacent to the opening 42 in the front wall 74, is connected to a blower 76. The blower 76 is connected to the chamber 50 of the oven 18 in a region adjacent to the front wall 74. The nozzle 70 is positioned to blow the recirculated air from the chamber 50 downward across the inlet opening 42 and at an angle inwardly therefrom. As described in greater detail in the present inventor's U.S. Pat. No. 4,298,341, this construction is effective to prevent the escape of atmosphere from the chamber 50 to the exterior of the bake oven 18, and at the same time, the flow of air across the inlet opening 42 is sufficiently low that parts, designated 78, carried on hangers 80 on the monorail 10 will not be blown from the hangers and will be permitted to pass through the chamber 50 of the bake oven in an orderly manner.

The spray booth however is provided with a flow of air from the ambient atmosphere typically through an opening at the front of the booth, and is drawn through the booth by a ventilating fan to provide fresh air to the interior of the spray booth. An exit port 90 (FIG. 2) exhausts the atmosphere from the interior of the spray booth 16, and the exit port 90 is connected to a blower 94. A conduit 96 from the blower conducts solvent laden air from the spray booth to one of two filters 98 or 100. A valve 102 is connected between the conduit 96 and the filters 98 and 100 to direct the air from the spray booth 16 to filter 98 or filter 100. The filters 98 and 100 have outlets connected to a valve 104 which couples the filters 98 or 100 to ambient atmosphere designated exhaust.

Figure 2:
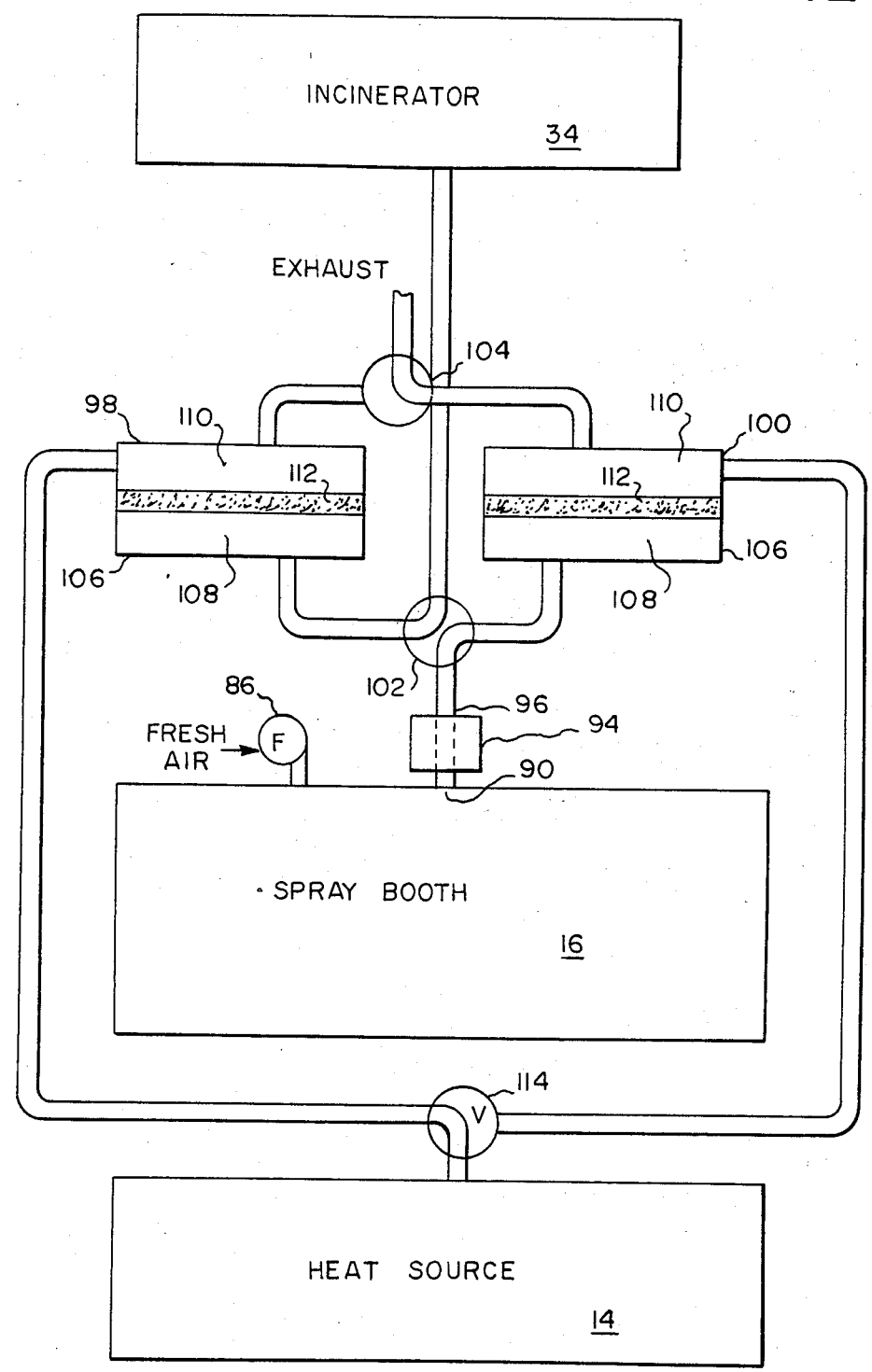
FIG. 2 is a diagrammatic view of the spray booth solvent control system according to the present invention.

The spray booth pollution control system is best illustrated in FIG. 2. Each of the filters 98 and 100 has an air-tight enclosure 106 divided into two compartments 108 and 110 by a layer 112 which extends centrally across the enclosure 106. The layer 112 comprises a mass of filtering material, such as activated carbon. The valve 102 is connected to the one compartment 108 of each of the filters 98 and 100.

The compartments 110 of the filters 98 and 100 are not only connected to the valve 104, but also through a separate conduit to the heat source or dry-off oven 14. The incinerator or burner 34 is connected to the valve 102.

In operation, fresh air enters the spray booth 16 and is continuously flushed through either the filter 98 or the filter 100, depending upon the position of the valve 102. When the valve 102 connects the spray booth 16 to the filter 100, as illustrated in FIG. 2, solvent vapors from the paint in the spray booth are deposited on the activated carbon layer 112 of the filter 100 as the air flows through the filter 100 and the valve 104 to exit into the atmosphere.

During a previous operating cycle, the filter 98 was coupled to the spray booth by the valve 102 and has been loaded with paint solvent.

In the embodiment of FIGS. 1 and 2, solvent laden air from the spray booth passes through the filters 98 or 100 in one direction, and degassing air from the heat source 14 passes through the filter. Preferably, for optimum operation, degassing air is passed through the filter in the direction opposite to that which the filter was loaded. The reverse flow of air through the filter has the effect of further limiting the initial evolution of vapors from the filter in order to produce a relatively constant evolution of vapors over a prolonged period of time. The filter may of course be degassed in the forward direction as well as the reverse direction, but with an increase in the initial evolution of vapors. As stated, the temperature of the air from the heat source 14 is between 100° F. and 280° F., and the air velocity is such that the pressure across the filter is less than about 6" water.

As illustrated in FIG. 1, air from the spray booth 16 is connected to filter 98 through the valve 102 and to the exhaust through the valve 104. Also, filter 100 is in the process of degassing, and the valve 114 has connected the dry-off oven 14, functioning as the heat source, to filter 100, and valve 102 has connected filter 100 to the incinerator through the bake oven 18. Valves 102, 114, and 104 are preferably ganged together so that switching of the valves to their opposite position will produce the connections shown in FIG. 2 in which the spray booth is connected to filter 100 and filter 98 is being degassed.

In the degassing process, valve 102 connects the filter 98 or 100 to the bake oven 18, thereby mixing the vapors of degassing from the filter with the atmosphere of the bake oven. This has the effect of averaging the vapors from the filter to provide a relatively constant volume of vapors to the burner of the washer 12 for incineration. A vapor control unit 116 monitors the level of solvent vapors in the bake oven, and if this level exceeds the threshold value earlier described, the vapor control opens valve 118 to permit fresh air to be mixed with air from the dry-off oven 14, thereby providing a lower temperature air to the pump 120. As a result of lowering the temperature used for degassing filter 100, the quantity of vapors entering bake oven 18 will be reduced.

Figure 5:
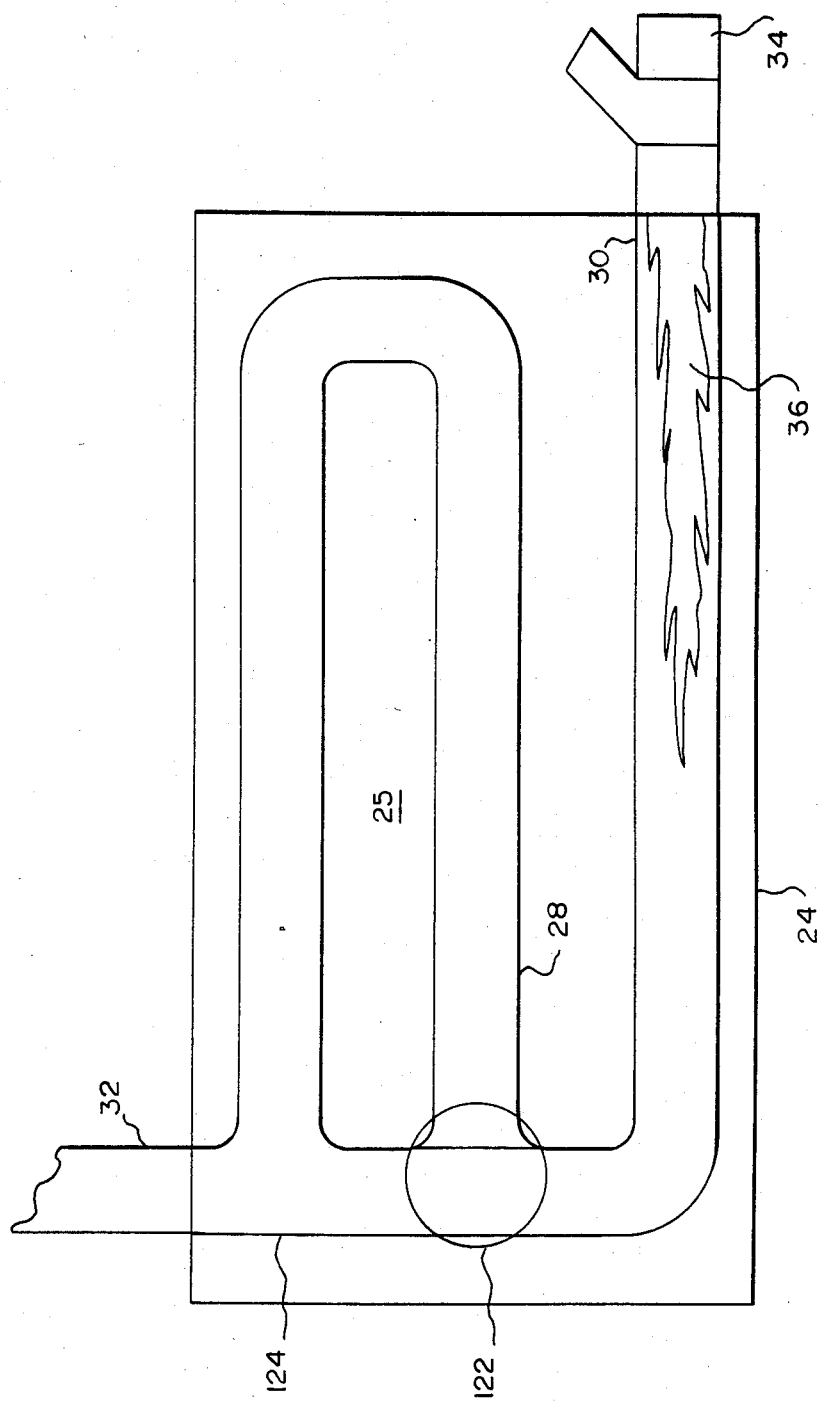
FIG. 5 is a sectional view taken along the line 5—5 of FIG. 4.

As illustrated in FIG. 5, the serpentine tube 28 is provided with a valve 122 and a bypass tube 124 to effectively shorten the length of the tube. The flame 36 in the tube of the incinerator extends for a distance of between five and twenty feet, and the valve 122 is located down stream from the end of the flame. The tube 28 acts as a heat exchanger, not only in the region in which the flame exists, but in the region from the end of the flame to the outlet port 32. By shortening the length of the path of the hot gasses from the flame 36 by means of the bypass 124, the amount of heat transferred from the flame 36 to the water 25 in the tank 24 is reduced, and the temperature of the gasses emerging from the exit port 32 are increased. In this way the temperature of the body of water 25 in the tank may be reduced, and the parts washed in cooler spray. On the other hand, the temperature of the dry-off oven 14 is increased by utilization of the bypass 124, and, air from the dry-off oven may be used to degass the filters without the need for additional heating of the atmosphere of the dry-off oven. The valve 122 may therefore be utilized to control degassing of the filters 98 and 100.

Those skilled in the art will devise many modifications and uses for the present invention above than set forth in this specification. It is therefore intended that the scope of the present invention be limited not by the foregoing specification, but rather only by the appended claims.

I claim:

1. In an industrial painting system including a spray booth and a bake oven, a method for the removal and disposal of the paint solvent contained in the spray booth exhaust gas discharged from the spray booth comprising,
   (a) passing solvent laden exhaust gas from said spray booth through a filter capable of adsorbing said solvent from said spray booth exhaust to remove said solvent from said exhaust;

(b) degassing said filter by passing through said filter a gas such that the pressure drop across said filter is less than about six inches of water, said gas having a velocity and temperature sufficient to remove said solvent from said filter such that the solvent concentration in the gas exhausted from the filter does not exceed the lower explosive limit for the solvent;

(c) introducing said filter exhaust to said bake oven to increase the solvent concentration in the bake oven atmosphere; said degassing gas velocity and temperature being so selected that upon introduction of said filter exhaust to said bake oven, the solvent concentration in the bake oven does not exceed the lower explosive limit of the designed theoretical level of operation of the brake oven;

(d) removing a portion of the atmosphere of the bake oven from the bake oven and incinerating said bake oven atmosphere so as to oxidize said solvent to non-polluting combustion products and thereby dispose of said solvent.

2. The method of claim 1 wherein said bake oven atmosphere is incinerated in a washer having a burner, and whereby the solvent provides a supplement to the fuel requirement of the burner.

3. The method of claim 1 wherein said industrial painting system includes a drying oven suitable for drying a wet work piece and the gas for degassing the filter is provided by the exhaust from said drying oven.

4. The method of claim 1 wherein said degassing gas temperature is in the range of from about 100° F. to about 280° F.

5. The method of claim 1 wherein said filter is activated carbon.

6. The method of claim 1 wherein the flow of said degassing gas is co-current with said adsorption flow.

7. The method of claim 1 wherein the flow of said degassing gas is counter-current to said adsorption flow.

8. In an industrial painting system comprising a washer having a burner, a dry-off oven, a spray booth and a bake oven, a method for the removal and disposal of the paint solvent contained in the spray booth exhaust gas discharged from the spray booth, comprising passing solvent laden exhaust from said spray booth through a solvent concentrating means to remove solvent from said exhaust and to concentrate said solvent, removing the solvent from said concentrating means by passing through said concentrating means a gas such that the pressure drop across said concentrating means is less than about six inches of water, said gas having a velocity and a temperature sufficient to remove said solvent to form a solvent laden gas such that the solvent concentration in said solvent laden gas does not exceed the lower explosive limit for the solvent, introducing said solvent laden gas to the bake oven to increase the solvent concentration in the bake oven atmosphere said gas velocity and temperature being so selected that upon introduction of said solvent laden gas to said bake oven the solvent concentration in the bake oven does not exceed the lower explosive limit of the designed theoretical level of operation of the bake oven, introducing a portion of the solvent laden atmosphere of the bake oven to the burner of the washer to incinerate the solvent, and passing the gasses produced by the incineration of the solvent to the dry-off oven to form the atmosphere of the dry-off oven.

9. The method of claim 8 wherein the solvent concentrating means is an activated carbon filter.

10. The method of claim 9 wherein the gas passing through said filter has a temperature of from about 100° F. to about 280° F.

11. The method of claim 9 wherein the gas passing through said filter to remove solvent is co-current with the solvent concentrating flow.

12. The method of claim 9 wherein the gas passing through said filter to remove solvent is countercurrent to said solvent concentrating flow.

13. The method of claim 8 wherein at least a portion of the dry-off oven atmosphere is passed to said solvent concentrating means to remove solvent therefrom.

* * * * *

UNITED STATES PATENT AND TRADEMARK OFFICE
CERTIFICATE OF CORRECTION

PATENT NO. : 4,565,553

DATED : January 21, 1986

INVENTOR(S) : William C. Nowack

It is certified that error appears in the above-identified patent and that said Letters Patent is hereby corrected as shown below:

On the title page Insert:

-- (73) Assignee: Bildon Industries, Inc. --.

Column 9, line 16, "brake" should read -- bake --.

Signed and Sealed this

Fifth Day of August 1986

[SEAL]

Attest:

DONALD J. QUIGG

Attesting Officer

Commissioner of Patents and Trademarks